United States Patent [19]

Geisel

[11] 4,391,620
[45] Jul. 5, 1983

[54] METHOD AND DEVICE FOR APPLYING LUBRICATION OR SEPARATION LIQUID TO GLASS-FORMING MACHINE

[75] Inventor: Gerhard Geisel, Bückeburg, Fed. Rep. of Germany

[73] Assignee: Hermann Heye, Obernkirchen, Fed. Rep. of Germany

[21] Appl. No.: 235,137

[22] Filed: Feb. 17, 1981

[30] Foreign Application Priority Data

Feb. 28, 1980 [DE] Fed. Rep. of Germany ....... 3007512

[51] Int. Cl.³ .............................................. C03B 40/02
[52] U.S. Cl. ......................................... 65/26; 65/160; 65/170; 184/6.26; 239/99; 239/274
[58] Field of Search ................... 65/160, 164, 170, 26; 239/99, 274; 184/6.26

[56] References Cited

U.S. PATENT DOCUMENTS

| | | | |
|---|---|---|---|
| 1,638,593 | 8/1927 | Mulholland | 65/170 |
| 2,230,609 | 2/1941 | Cannon | 65/170 X |
| 2,754,627 | 7/1956 | Denman | 65/170 |
| 2,844,918 | 7/1958 | Van De Walle et al. | 65/169 X |
| 3,141,752 | 7/1964 | Keller | 65/169 X |
| 3,523,016 | 8/1970 | Mattos | 65/169 X |
| 3,580,711 | 5/1971 | Hamilton | 65/169 |
| 3,721,542 | 3/1973 | Keller | 65/169 |
| 3,814,594 | 6/1974 | Mumford | 65/169 |

Primary Examiner—Richard V. Fisher
Attorney, Agent, or Firm—Michael J. Striker

[57] ABSTRACT

A device for an intermittent application of a lubrication or a separation liquid to a component part of a glass-forming machine engageable with molten glass, includes an intermittently driven high-pressure pump and a spraying nozzle connected to the pump by a pressure conduit to apply momentarily a cone of atomized lubrication or separation liquid on the machine part at a pressure of at least 100 bars.

16 Claims, 16 Drawing Figures

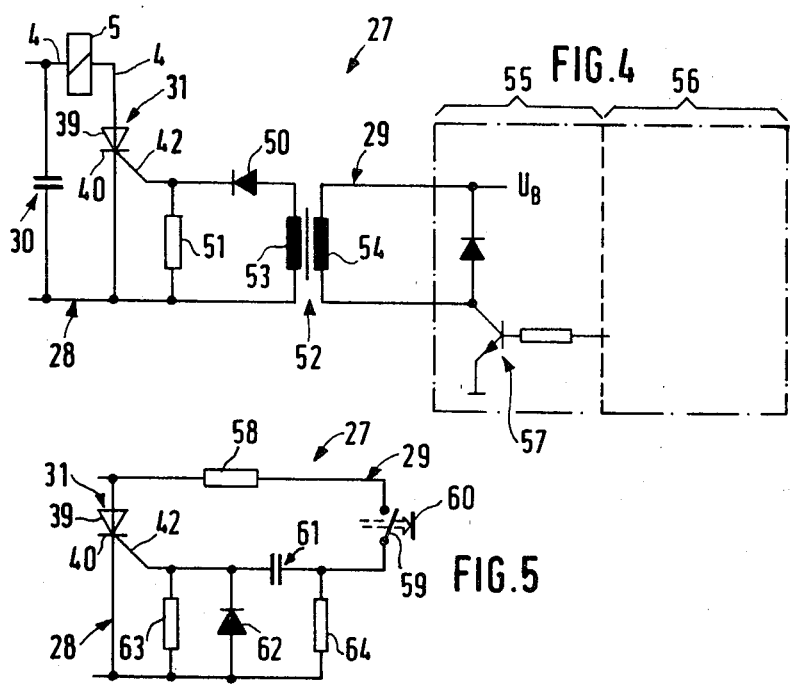
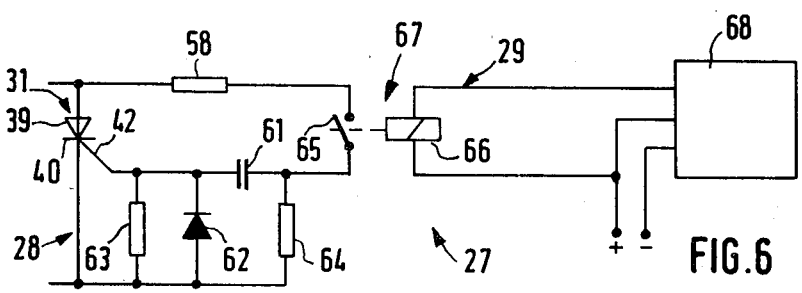
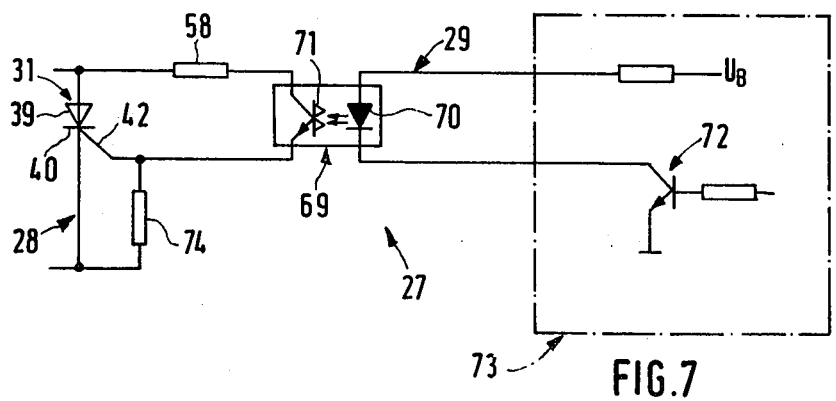

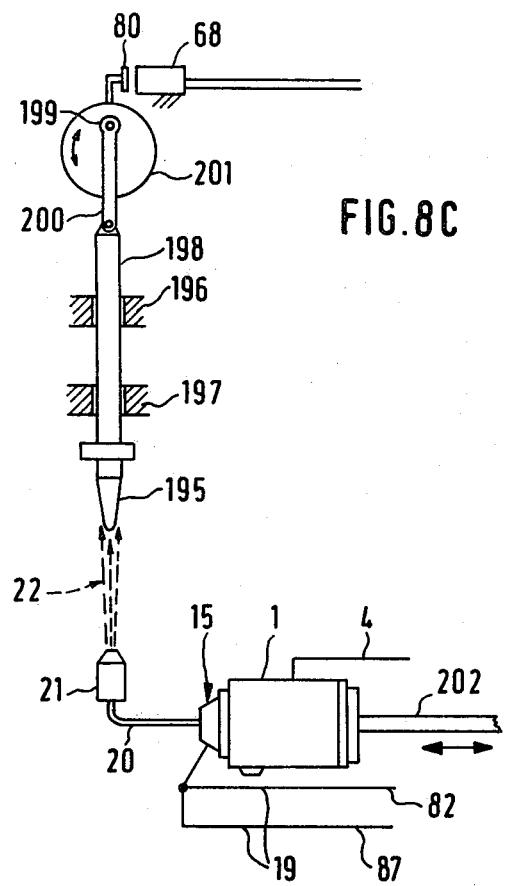

METHOD AND DEVICE FOR APPLYING LUBRICATION OR SEPARATION LIQUID TO GLASS-FORMING MACHINE

BACKGROUND OF THE INVENTION

The present invention relates in general to a glass-forming or shaping machine, and in particular to a device for an intermittent application of a lubrication or separation liquid on at least one part engaging process glass in a glass-forming machine, such as glass shears, a gravity tube or a chute for guiding glass gobs, a mold, a mold part or a plunger.

In the manufacture of glass objects in a glass-forming machine, component parts, particularly the surfaces of parts of the glass-forming machine that come into contact with the processed glass, must be in regular time intervals coated with a lubrication or separation liquid. By means of such coating, frictional and adhesive conditions between the machine part and glass on the one hand, and between the interacting machine parts on the other hand, are improved.

Lubrication or separation liquid has been hitherto applied to the parts of the glass-forming machine at regular intervals, for example after each 200-th working cycle by hand by means of tampons or dippers. This manual application, however, is unsuitable for supplying reproducible amounts of lubrication liquid nor can it provide for a uniform distribution of the liquid over the entire surface of the machine part. In addition, a relatively high waste takes place, for example 1 to 2%, because upon each application the first glass objects are polluted by the excessive liquid and exhibit burned residuals which make them commercially inferior. An additional drawback of such a manual process is in the fact that the application of the lubrication and separation liquid cannot take place in each working cycle, and therefore a certain storage of the liquid on the parts is necessary.

SUMMARY OF THE INVENTION

It is therefore a general object of the present invention to overcome the aforementioned disadvantages.

More particularly, it is an object of the invention to provide a device which permits a fully mechanized application of the lubrication or separation liquid to the glass-forming machine.

An additional object of the invention is to improve the reproducibility of time points of the application.

A further object of this invention is to provide fine dosing of reproducible amounts of the lubrication or separation liquid.

In keeping with these objects, and others which will become apparent hereafter, one feature of the invention resides in the provision of a device for application of a lubrication or separation liquid on a component part of a glass-forming machine, the device including at least one high-pressure pump for delivering the lubricating or separating liquid at a pressure exceeding 100 bars, drive means for activating at least one of said pumps, a high-pressure conduit connected to the outlet of the pump, and a spraying nozzle connected to the high-pressure conduit for spraying at the pressure exceeding 100 bars, the liquid on the machine part.

By means of such a high-pressure spraying, preferably without the use of a driving or carrying gas, the desired amount of lubrication or separation liquid is finely atomized and in this condition is applied onto the relevant component part of the glass-forming machine. The uniformity of distribution of the lubrication or separation liquid coating is very high.

By controlling the actuation of the drive of the high-pressure pump, the moment of spraying can be selected in very narrow limits and at reproducible time intervals. When using a plurality of spraying nozzles of this invention, the latter can be connected to separate high-pressure pumps which in turn can be actuated independently one from the other so as to deliver the lubrication or separation liquid to individual spraying nozzles or to predetermined groups of nozzles in accurate time intervals. When the lubrication or separation liquid is discharged without the use of a driving or carrying gas, a particularly fast and complete wetting of the desired surfaces is ensured because no gas component in spraying jets can unfavorably influence the trajectory of individual droplets of the liquid.

In one embodiment of this invention, control means for activating the high-pressure pump includes a solenoid the armature of which actuates the pressure pump whereby a winding of the solenoid is electrically connected in a control circuit including a discharging circuit for an energy-storing capacitor. The power supply circuit for the energy-storing capacitor includes a controllable circuit element connected in series with the capacitor and being controlled by an adjustable branch circuit. This embodiment has a relatively low spatial requirement and can be installed in an immediate vicinity of the component part of the glass-forming machine to be sprayed on, and consequently has the advantage that it requires only very short high-pressure conduits. It enables fine dosing of lubrication or separation liquid to be sprayed and in all cases permits a sufficient reproducibility of time points of spraying. The solenoid, in spite of considerable forces to be generated, can be of a relatively small construction because its winding is energized only momentarily and therefore it can withstand very high currents.

In another embodiment of this invention the loading circuit for the energy-storing capacitor includes a voltage-doubling circuit. The capacitor in this manner can be loaded with minimum losses. The energy-storing capacitor can be for example a heavy-duty electrolytic capacitor.

In another modification of this invention, the energy-supply circuit includes a power transformer for supplying power to a plurality of parallel-connected loading circuits whereby each loading circuit includes the aforementioned energy-storing capacitor. In this manner, the branching of the control means for the high-pressure pump can be made with minimum cost. The same effect can be achieved when excitation windings of several solenoids for driving respective high-pressure pumps are connected to a single discharging circuit of the energy-storing capacitor.

In one embodiment of this invention, the controllable switching element is a thyristor the control gate of which is connected to a control part of the control circuit. In this manner efficient switching operation is achieved with a very simple circuit.

In order to increase operational safety, in another embodiment of this invention the energy-supplying circuit and the control part of the electric control circuit are galvanically separated one from the other, for instance by means of an optoelectric coupler, or by a relay contact or by a trigger transformer. The optoelectric coupler can be either a transistor-type or a thyristor-type coupler.

In still another embodiment of this invention the control part of the electronic control circuit includes a control element such as for example a relay contact, for connecting a computing system to a proximity indicator or another electronic control in the glass-forming machine. In this manner, it is possible to control device of this invention for different modes of operation of the machine.

In still another modification, the control part of the electronic control circuit includes a push button acting as the control element.

In modern, fully automatic glass-forming machines, each spraying process requires between 5 and 40 cubic millimeters of lubrication or separation liquid, depending on the size or load on the surface to be sprayed. For the spraying step, there are frequently only a few milliseconds available. In addition, installation space in such glass-forming machines, due to the dense arrangement of respective construction elements, is limited. The aforedescribed embodiments of the device of this invention permit even under the compact design of glass-forming machines an installation and a reliable application of the lubrication and separation liquid.

In another modification of the device of this invention, driving means for the high-pressure pump are constituted by a pneumatic motor which also enables an accurate control of the pump. The pneumatic motor can be in the form of a cylinder-and-piston unit, the piston rod of which immediately controls at least one pressing pump.

Driving means for respective pressing pumps, in another embodiment, are in the form of a camshaft cooperating with flat or roller plungers coupled to the pressing pump so that the latter are directly driven by the individual cams. In comparison with driving pneumatic motors, the camshaft drive results in a better reproducibility of spraying time intervals. Preferably, the driving camshaft is coupled to an electric motor having a speed control.

In order to achieve relatively small driving units, in still another modification of this invention the camshaft is coupled to another camshaft for driving another pressing pump. In this manner it is possible to create a modular system for controlling a large number of spraying nozzles. For example, it is possible to employ for a single glass-forming machine twenty to one hundred pressing pumps for spraying the lubrication or separation liquid.

The spraying processes can be further differentiated when transmission gears are coupled between at least two consecutive camshafts.

The inlet of the pressing pump is connected to a low-pressure conduit for feeding lubrication or separation liquid whereby a pressure-limiting valve is connected in a return conduit leading from the pump to the tank. In this manner, a continuous and uniform supply of the liquid to the pump is ensured. The lubrication or separation liquid can continuously circulate in the low-pressure conduit. This arrangement has the advantage that if the liquid is constituted by a mixture of liquid components any tendency to separation is thus prevented. In addition, the lubrication and separation liquid can be easier maintained on the desired temperature level.

Pressing pumps in the device of this invention can be operated either for pressing out from a lower dead center of the pump piston (LD-pressing out) or by pressing out from a starting point between the lower and upper dead centers up to the upper dead center point of the pump piston (UD-pressing out). For the purpose of the present invention, and particularly for the electromagnetic drive of the pressing pump, the most suitable pressing out is the upper dead center pressing out, since kinetic energy stored in the moving parts of the device is added to the exerted driving energy. This additional kinetic energy, especially in the case of spraying relatively minute amounts of the lubricating or separating liquid during a very short spraying period, contributes to the desired prompt pressure increase in the lubrication liquid.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIGS. 4–7 show respectively different modifications of a control part in the control circuit according to FIG. 3;

FIG. 8C is still another modification of the device of FIG. 8;

DESCRIPTION OF THE PREFERRED EMBODIMENTS

Figure 1:
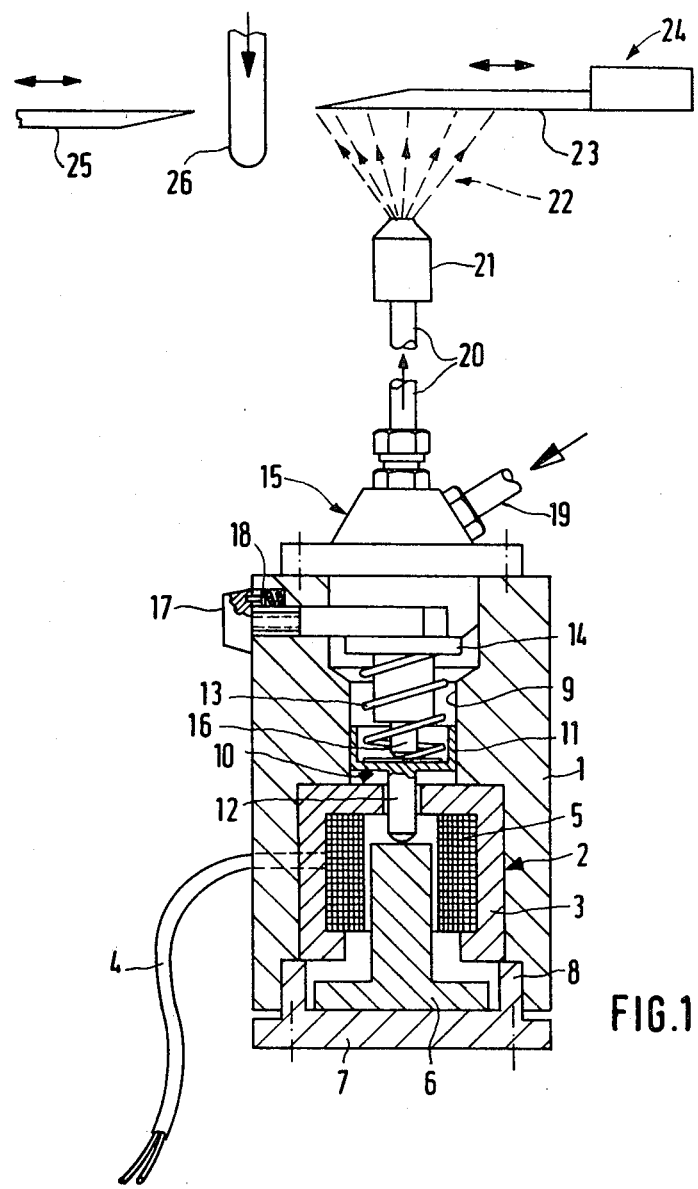
FIG. 1 is a longitudinal section of an applicator according to this invention provided with an electromagnetic drive.

FIG. 1 illustrates an electromagnetically driven applicator including a solenoid 2 mounted in a housing 1. The solenoid includes a yoke-shaped core 3 surrounding a winding 5 and a movable armature 6 which in FIG. 1 is depicted in its inoperative position in which it rests on a bottom plate 7. The bottom plate is screwed to the housing 1 and by means of an inner ring 8 is also fixing the core $3_x$ in position.

The upper part of housing 1 is formed with a bore 9 in which an intermediate plunger 10 is guided for a reciprocating axial movement. The plunger 10 is formed with a cup-shaped upper part 11 and a downwardly projecting plunger pin 12 in contact with the armature 6. A biasing spring 13 arranged between the bottom of the cup-shaped upper part 11 of the plunger 10 and a housing 14 of a pressing pump 15 biases via the plunger pin 12 the armature 6 into its rest position. The housing 14 of the pump is inserted into a matching recess in the housing 1 and is provided with a mounting flange secured to the top face of housing 1 by screws. A working piston 16 of the pressing pump 15 is surrounded by biasing spring 13 and is in contact with the bottom of the cup-shaped upper part 11 of the intermediate plunger 10. An adjustment device 17 projects laterally into housing 1 and serves for adjusting the stroke of the pump 15 and thus adjusts the delivered amount of a lubrication or separation liquid. The position of the adjustment device 17 is arrested by a locking device 18. The lubrication or separation liquid is fed to the pressing pump 15 by means of a low-pressure conduit 19 and is discharged from the pump 15 via a high-pressure conduit 20 into a spraying nozzle 21. A spraying cone 22 of atomized lubrication or separation liquid is momentarily applied to a shearing blade 23 of glass gob shears 24. Shearing blade 23 cooperates with an opposite shearing blade 25, both blades being guided for a reciprocating movement in the direction as indicated by double arrows to sever successive glass gobs from a downwardly moving glass strand 26. The individual severed glass gobs are successively fed into a non-illustrated glass-forming machine.

Sufficient lubrication of shearing blades 23 and 25 is ensured when only one blade 23 is sprayed in the fully open end position of the shears 24 while a relatively minute amount of the lubrication liquid from the nozzle 21 sprayed momentarily under high pressure by a momentary energization of the winding 5 of solenoid 2. If desired, the shearing blade 25 can also be additionally sprayed by the lubrication liquid from a similar nozzle corresponding to that illustrated in FIG. 1.

Figure 2:
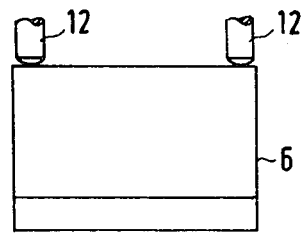
FIG. 2 is a side view of a component part in another embodiment of the applicator according to this invention.

For this purpose, armature 6 activates simultaneously another plunger pin 12 of the additional, non-illustrated pressing pump (FIG. 2).

Figure 3:
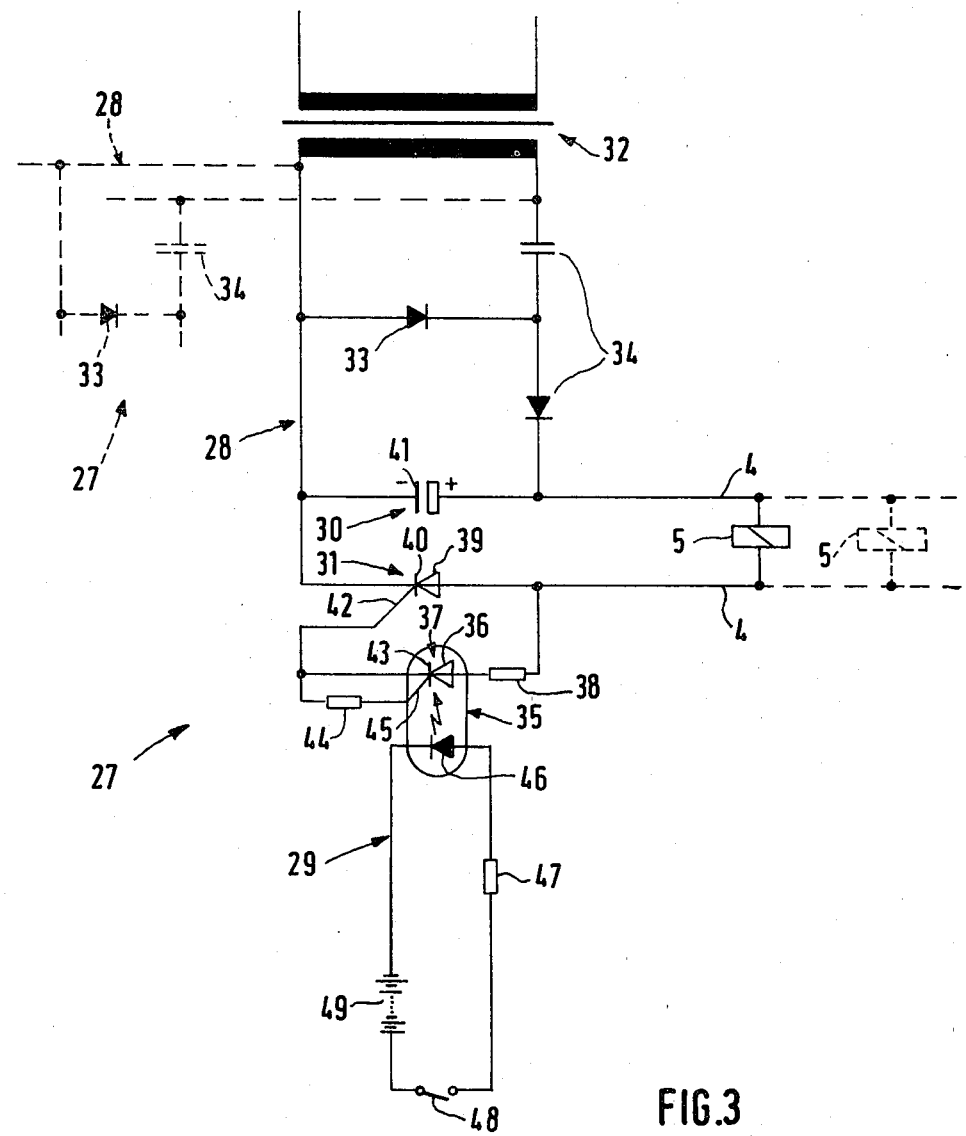
FIG. 3 is a schematic circuit diagram of electrical control means for the applicator according to FIG. 1.

FIG. 3 shows a schematic circuit diagram of an electric control device 27 for the momentary energization of winding 5 of the solenoid 2. The control device includes a power supply circuit 28 and a control circuit 29.

Winding 5 of the solenoid is connected in series with a capacitor 30 in the form of a heavy-duty electrolytic capacitor which is charged from the power-supply circuit 28 and controlled by a controllable switching element 31 connected in series with the capacitor 30 and winding 5. In this example, the controllable switching element 31 is a thyristor.

The power-supply circuit 28 charging the capacitor 30 includes a transformer 32 having its secondary winding connected to a rectifying diode 33 and a voltage doubler 34. The primary function of the voltage doubler 34 is not to increase the rectified voltage but to load the capacitor 30 without generating losses in the loading circuit and thus to limit the generation of heat.

The power-supply circuit 28 is galvanically separated from the control circuit 29 by means of an optoelectric coupler 35. The optoelectric coupler 35 includes a separate photothyristor 37 having an anode 36 connected by a load resistor 38 to the anode 39 of the switching element 31. The load resistor 38 limits current flowing through the control gate 42 of the switching element 31. The cathode 40 of the switching element 31 is connected to an electrode 41 of the capacitor 30 and the control gate 42 of the switching element 31 is connected to cathode 43 of the photothyristor 37 and the latter is connected via a resistor 44 to its control gate 45. The resistor 44 adjusts the sensitivity of the optoelectrical coupler 35, namely if the resistor 44 is low, the sensitivity is reduced, and vice versa. A light-emitting diode 46 of the optoelectrical coupler 35 is connected via a resistor 47 and a switch 48 to an auxiliary voltage source 49. Resistor 47 serves for limiting current flowing through the diode 46.

As indicated in dashed lines in the upper lefthand portion of FIG. 3, an additional power-supply circuit 28 including an additional rectifying diode 33 and voltage doubler 34 is connected to the transformer 32 and parallel to the above-described power-supply circuit 28 to feed a non-illustrated additional capacitor for use in a corresponding control device 27 driving at least one additional applicator of this invention. Even further power-supply circuits 28 may this way be connected in parallel.

Moreover, as indicated in dashed lines in FIG. 3, at least one solenoid winding 5 connected parallel to the aforementioned winding 5 serves for simultaneously controlling additional applicators according to the invention.

A modified version of the control circuit 27 is illustrated in FIG. 4. A switching element in the form of a thyristor 31 has its control gate 42 connected via a diode 50 and a resistor 51 to a secondary winding 53 of a triggering transformer 52. The switching thyristor 31 is triggered in such a manner that a positive voltage is supplied to its control gate 42 until a current starts flowing. The negative electrode of the capacitor 30, the cathode 40 of the switching element, and the resistor 51 are connected to one terminal of the secondary winding 53 of the transformer 52, whereas the other terminal is connected via the diode 50 to the other pole of the resistor 51 and to the control gate 42. When in an inoperative condition no control signals are induced in the secondary winding 53, no voltage drop occurs across the resistor 51 and the control gate 42 is on the same potential as the cathode 40 and the switching element 31 is closed.

When, however, a control pulse is applied to the primary winding 54 of the triggering transformer 52, a positive voltage induced on the secondary winding 53 effects current flow through the diode 50 to the control gate 42 and triggers a large current through the electrodes 39 and 40 of the switching element 31. The diode 50 protects the switching element against excessively high negative voltages on the control electrode 42 by blocking negative pulses.

As illustrated in FIG. 4, primary winding 54 is also connected to an interface or to a section 55 acting as a matching circuit for a computer 56. The computer section 55 includes an output transistor 57 the collector circuit of which is connected in series with the primary winding 54 and with a source $U_B$ of an operating voltage. Computer 56 includes suitable logic circuits with an address preselection of a conventional design to render the transistor 57 conductive according to a given program. The output transistor 57 matches the working voltages and currents of the control device 27 to the peripheral devices of the computer section 55. In the example according to FIG. 4, the capacitor 30 is a metallized paper capacitor.

In the embodiment according to FIG. 5, anode 39 of the switching element 31 is connected via a load resistor 58 to a switch 59 so as to apply a positive voltage to the latter. If the switch 59 is closed by actuating a pushbutton 60, positive voltage is applied to a capacitor 61 whereby loading current flowing through the capacitor induces a positive voltage peak on its other electrode. This voltage peak is applied to the control gate 42 of the switching element 31 and triggers the latter. If the switch 59 is open, a negative voltage peak which is induced on the coupling capacitor 61 is shunted by the diode 62 which thus protects the control gate 42 against damage. The coupling capacitor 61 in the circuit of FIG. 5 cooperates with a resistor 63 and forms therewith a differentiating circuit. On closing or on opening the switch 59, the differentiating circuit thus produces from the sides of the rectangular voltage pulse the positive and the negative peak voltages, of which the latter are short-circuited by the diode 62. Resistor 64 in the circuit of FIG. 5 acts as a discharging element to discharge the capacitor 61 as soon as the switch 59 is opened.

The circuit according to FIG. 6 corresponds substantially to that in FIG. 5 with the exception that switch 59 is replaced by a relay contact 65 actuated in response to the energization of a winding 66 of relay 67. The relay 67 provides a galvanic separation between the power-supply circuit 28 and the control circuit 29 of the control device 27. Winding 66 of the relay is connected to a proximity sensor 68 operating an electronic switching circuit that either in response to a capacitive or inductive change introduced by a movable metallic part generates a signal at its output. The form of the output signal depends on the employed mode of operation. The proximity sensor in general includes an active sensing part connected to a suitable amplifier which produces the desired magnitude of the output signal in response to the open or closed condition of the proximity sensor. The proximity sensors are well known in the art and therefore need not be described in detail. In any event, the proximity sensor switch 68 energizes the winding 66 of relay 67 in response to a condition of a movable member in the glass-forming machine.

In FIG. 7 there is illustrated an optoelectric coupler 69 including a light-emitting diode 70 and a phototransistor 71 for separating galvanically the power-supply circuit 28 and the switching element 31 from the control circuit 29. The light-emitting diode 70 is energized again from an output transistor 72 of an electronic control unit 73, such as for example a timing control unit including a source of working voltage $U_B$. The output transistor 72 is controlled by an electronic timer to become momentarily conductive so that a momentary current flows through the light-emitting diode 70, causing the latter to emit light which in turn activates the phototransistor 71 and makes it conductive. As a result, a current flows from anode 39 via the load resistor 58 to the control gate 42 of the switching element 31, and the control gate 42 triggers a large current between anode 39 and cathode 40 of the switching element. The load resistor 58 limits current flowing through the phototransistor 71 and the switching element 31 to protect both of them. Resistor 74 between the cathode 40 and the control gate 42 ensures that in the case when no control signal is applied to the phototransistor 71, no undefined signal can be induced on the control gate 42 and the latter has the same potential as cathode 40.

Figure 8:
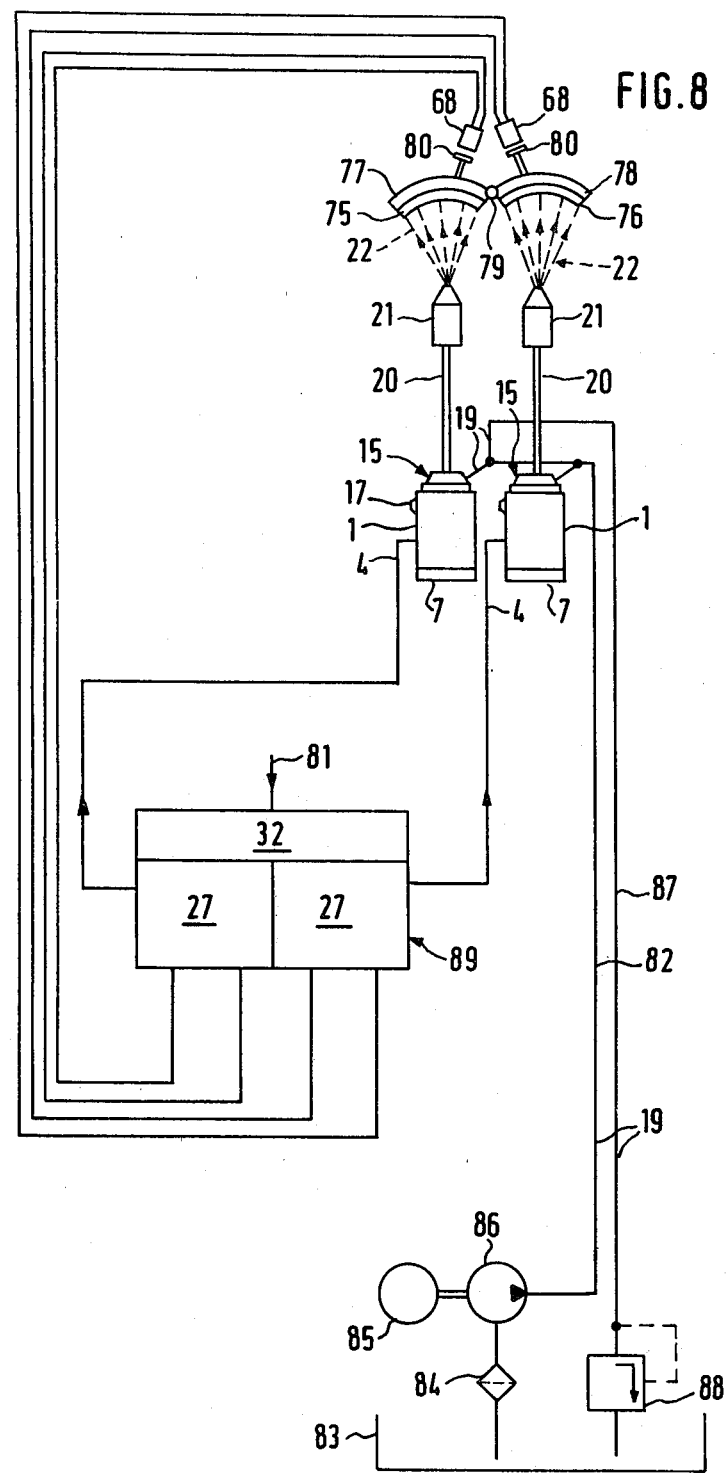
FIG. 8 is a schematic diagram of the layout of the application device according to this invention illustrated with two spraying nozzles.

FIG. 8 shows a device for applying a lubrication or separation liquid to finishing mold halves 75 and 76 respectively suspended in tongue halves 77 and 78 arranged in a known manner in a glass-processing machine. The tongue halves 77 and 78 are pivotally mounted on a pivot axle 79 and each supports on its outer side an initiating plate 80 cooperating with an assigned proximity sensor 68 according to FIG. 6. As soon as the plate is opposite its proximity sensor, the latter is brought into its switching condition and generates a signal applied to the aforedescribed electronic control devices 27 which in turn energize via conduits 4 the coils or windings 5 of solenoids 2 arranged in the housing 1.

In this example, two parallel-connected electronic control devices 27 are power-supplied from a single transformer 32, as disclosed in FIG. 3 (and the primary winding of the transformer 32 is connected to a main network 81).

Low-pressure conduit 19 is branched into two conduits 82 and 87, the latter leading to a tank 83 containing a lubrication or separation liquid. Branch conduit 82 is connected to the outlet of a delivery pump 86 driven by an electric motor 85 and the suction conduit of the pump 86 communicates with the tank 83 through a filter 84. The other branch 87 of the low-pressure conduit 19 serves as a return conduit including a pressure-limiting valve 88 which keeps pressure in conduit 19 at a constant level.

When finishing mold halves 75 and 76 are swung out into their fully open end positions, in which plates 80 are opposite their proximity sensors 68, the latter generate respectively a control pulse which initiates a spraying action in each of the two spraying nozzles 21.

A control unit 89 containing the power transformer 32 and the individual electric control circuits 27 can be installed on a suitable central place at a safe distance from the glass-forming machine proper. The central control unit 89 is sensitive to vibrations and temperature changes occurring in close proximity to the machine and for the sake of safe operation it should not be exposed to these unfavorable working conditions.

Figure 8A:
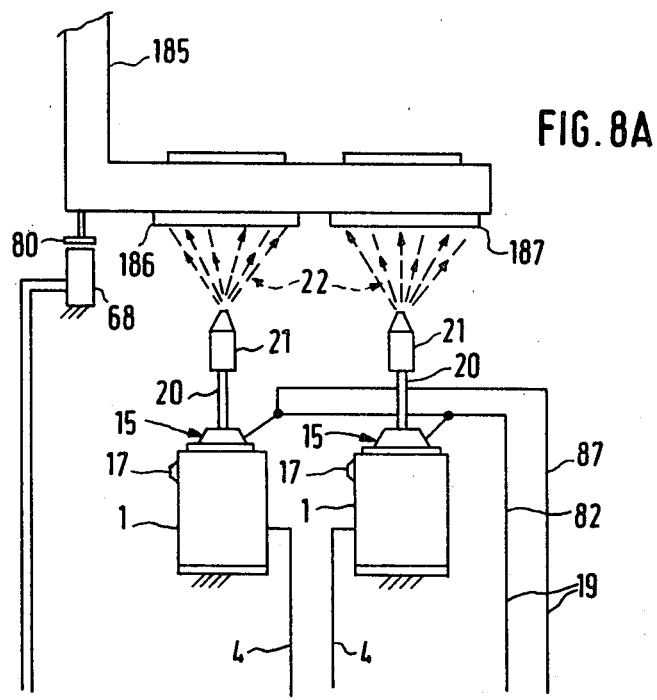
FIG. 8A is a modified part of a modification of the device according to FIG. 8.
Figure 8B:
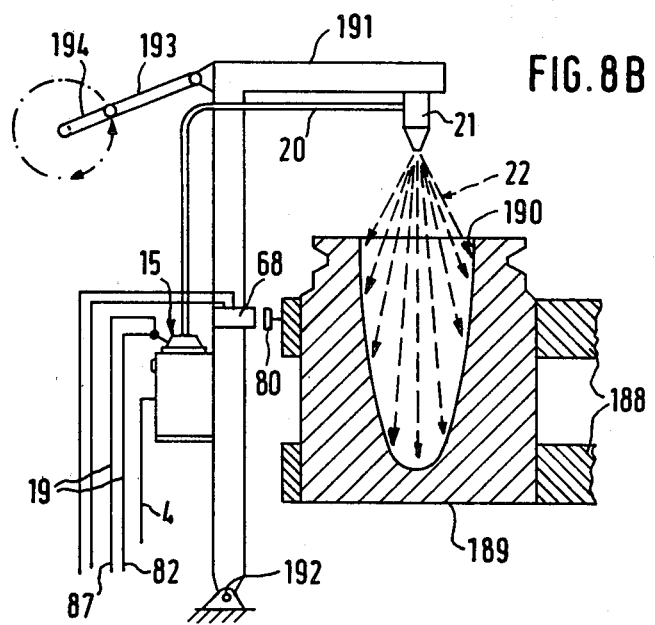
FIG. 8B is a side view, partly in section, of still another modification of the device according to FIG. 8.

In FIGS. 8A, 8B and 8C, illustrating details of modifications of the device of FIG. 8, like component parts are indicated by the same reference numerals.

In FIG. 8A, a supporting arm 185 carries split neck molds 186 and 187 along a path where the individual glass objects are manufactured. An initiating plate 80 is secured to the end of the supporting arm 185 and cooperates with a proximity sensor 68 fixedly mounted on the glass-forming machine. The proximity sensor 68 operates in the same manner as described above in connection with FIG. 8 and actuates spraying nozzles 21 to apply lubrication and separation liquid to neck molds 186 and 187.

In a modification illustrated in FIG. 8B, a holding member 188 carries an undivided parison mold or block mold 189. The molding cavity 190 preferably shortly before the reception of the molten glass gob is to be sprayed by the cone 22 of the lubricating and separating liquid. During the spraying action, the block mold 189 stands still. The initiating plate 80 is mounted on the holding member 188. The proximity sensor 68 as well as the pressing pump 15, the high-pressure conduit 20 and the spraying nozzle 21 are mounted on a rocking arm 191. The arm 191 is pivotally supported on a pivot axle 192 mounted on the machine frame and is linked with a coupler 193 to a crank 194 of a crank drive. In rotating or swinging the crank 194, arm 191 oscillates about its pivot axle 192 and as soon as the proximity sensor 68 is sufficiently close to the stationary initiator plate 80, spraying nozzle 21 is activated and applies the cone 22 of atomized lubrication or separation liquid into the cavity 190.

FIG. 8C illustrates schematically a plunger 195 connected to shaft 198 and guided in bearings 196 and 197 in the frame of the glass-forming machine. The free end of shaft 198 is linked by a coupler 200 to a crank pin 199 on an oscillatory disk 201 which drives the plunger 195 to perform a reciprocating movement. The oscillatory disk 201 also supports an initiating flag 80 cooperating with a proximity sensor 68 rigidly secured to the machine frame. The spray nozzle 21, high-pressure conduit 20, pressing pump 15 and housing 1 of the liquid applicator, however, are mounted on a carrier 202 which is suppoted for a sliding movement on the glass-forming machine. Nozzle 21 is thus shiftable into its spraying position in which its axis is in alignment with the longitudinal axis of the plunger 195 to apply momentarily the spray of lubrication liquid, as illustrated in FIG. 8C.

Figure 9:
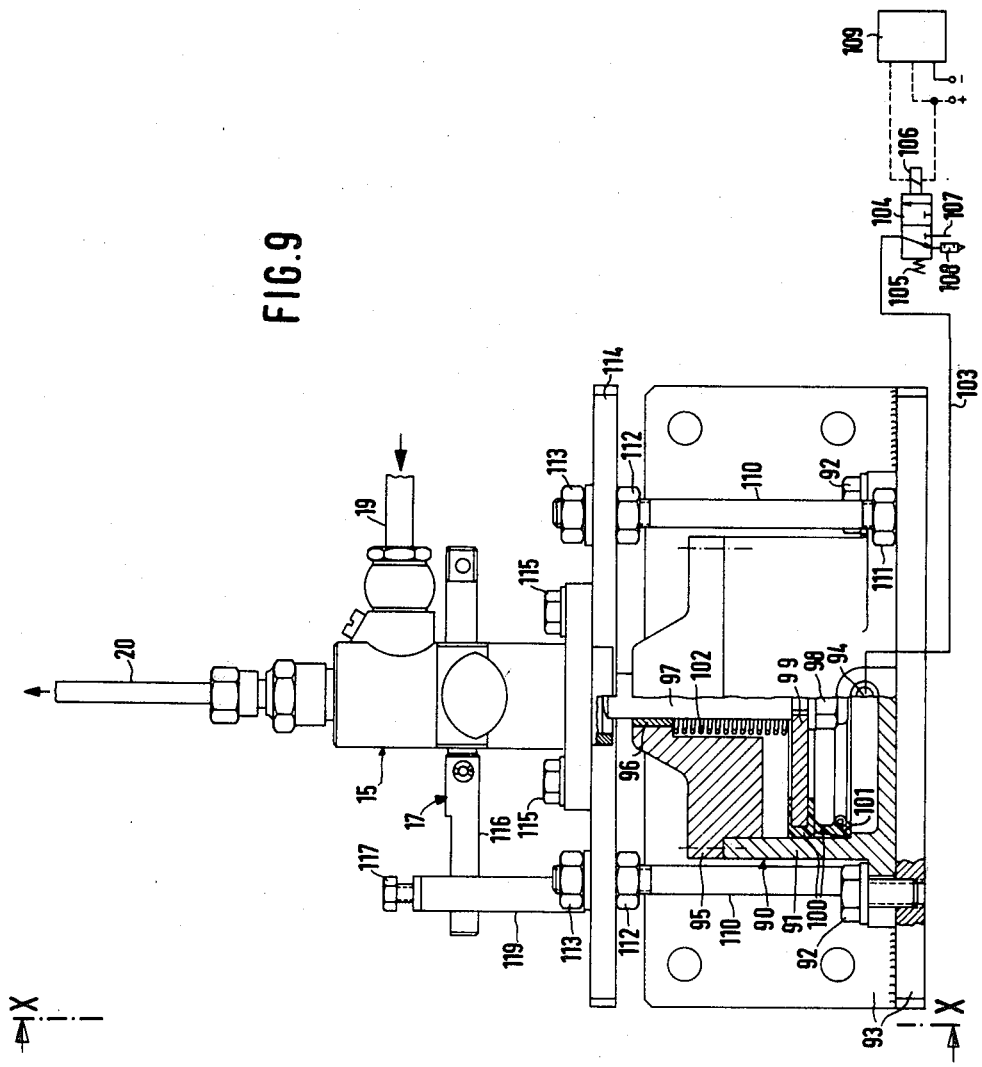
FIG. 9 is an embodiment of the application device of this invention, illustrated partially in a sectional view, and employing a pneumatic drive.
Figure 10:
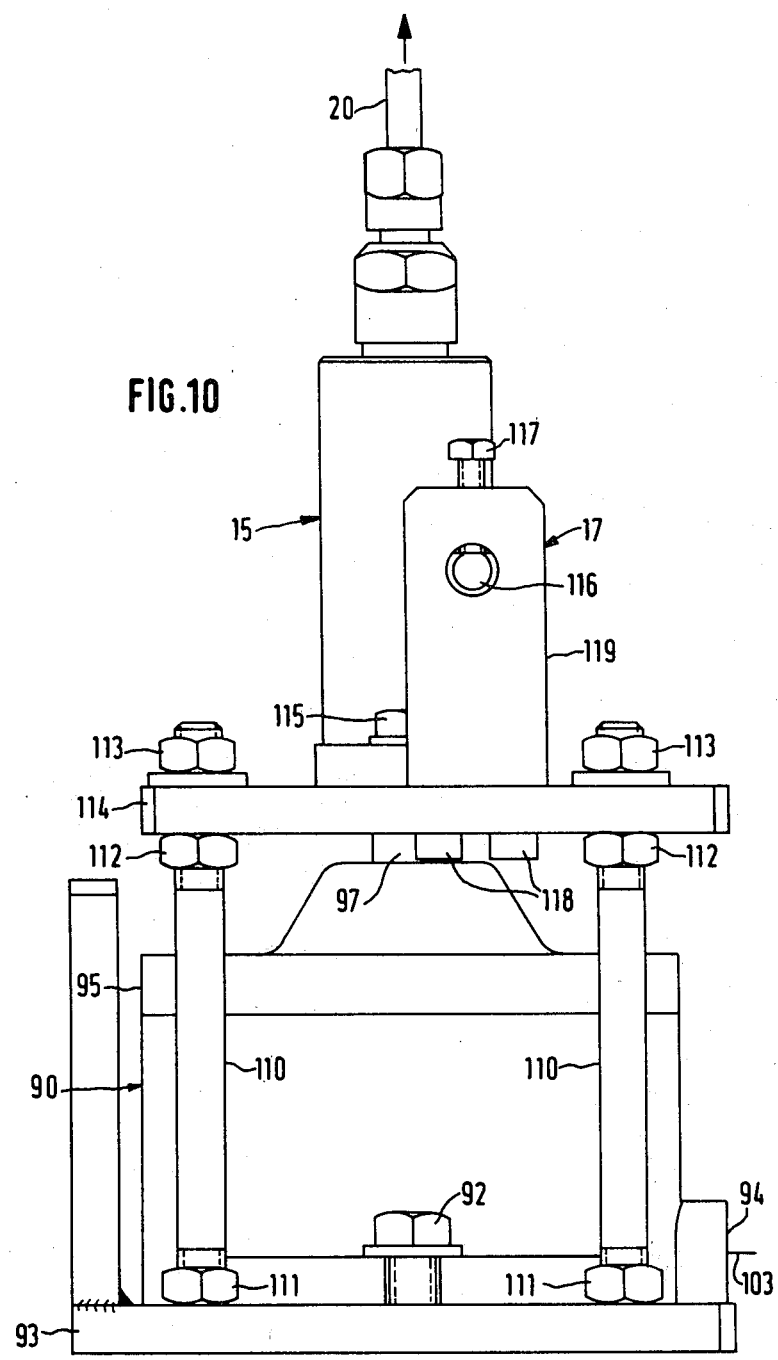
FIG. 10 is a front view of the device according to FIG. 9 taken along the line X—X.

FIGS. 9 and 10 show respectively different views of another embodiment of the drive for the pressing pump 15, namely a pneumatic motor in the form of a cylinder-and-piston unit 90.

A cylinder 91 of the unit 90 is fastened by screws 92 to a mounting plate 93 and is provided near its bottom with an inlet port 94 for compressed air. The upper opening of cylinder 91 is closed by a cover 95. A guiding bushing 96 is inserted in the center of the cover 95 for guiding a piston rod 97. The lower end of piston rod 97 is secured by a screw nut 98 to a piston 99, the latter being provided on its periphery with an annular seal 100 which in the rest position illustrated in FIG. 9 abuts against an annular flange 101 of cylinder 91. A resetting spring 102 is arranged between the cover 95 and the piston 99.

Inlet port 94 of the cylinder 91 is connected via a conduit 103 to a three-way, two-position directional control valve 104. Valve 104 is biased at one end by a resetting spring 105 which urges the valve into its normal position illustrated in FIG. 9, and a solenoid 106 arranged at the other end of the valve displaces the latter into the other position when actuated. A compressed air supply conduit 107 is connected to an inlet port of the valve whereas the outlet port is connected to a sound absorber 108. The actuation solenoid 106 of valve 104 is activated by a proximity sensor 109 corresponding in design to the sensor 68 in FIGS. 6 and 8. Instead of a proximity sensor, it is also possible to employ other types of pulse generators such as used in FIGS. 3, 4, 5 and 7.

A carrier plate 114 is secured to the mounting plate 93 by means of four spacer bolts 110 locked by lock nuts 111. Carrier plate 114 is vertically adjustable by means of nuts 112 and 113 engaging the threaded ends of the spacer bolts 110. Pressing pump 15 is fastened by screws 115 to the carrier plate 114 in such a manner that its plunger is in axial alignment in contact with piston rod 97 of the cylinder-and-piston unit 90. Stroke adjustment device 17 in this case includes a rod 116 which is displaceable to the left or to the right into a position in which it adjusts the desired amount of liquid delivered by the pump and in this position it is arrested by means of an arresting screw 117 cooperating with an arresting yoke 119 fixed to the carrier plate 114. In the embodiment according to FIGS. 9 and 10, piston rod 97 drives only a single pressing pump 15. In a modification, piston rod 97 can be provided at its free end with a fork-like member capable of driving simultaneously plungers of two pressing pumps 15 similarly as disclosed in FIG. 2.

Figure 11:
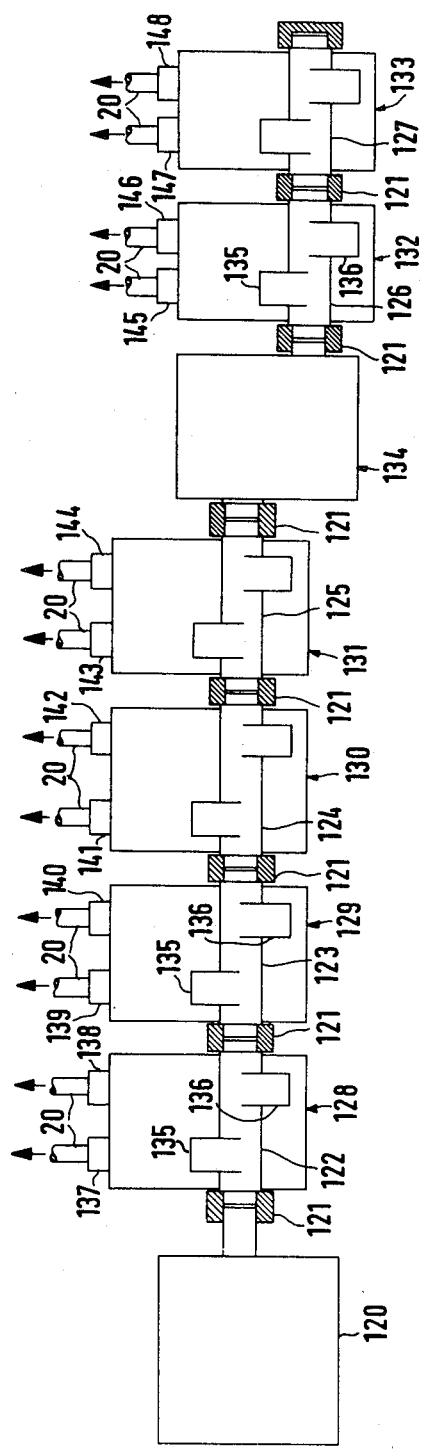
FIG. 11 is a partial longitudinal section of another embodiment of the device of this invention employing a driving camshaft.

FIG. 11 illustrates still another embodiment of a driving unit for pressing pumps in a plurality of applicators according to this invention. The driving unit includes an electric driving motor 120 having controllable speed and being synchronized in a conventional manner with the working speed of the glass-forming machine. Motor 20 is coupled by means of couplings 121 to a plurality of series-connected camshafts 122–127 assigned respectively to applicator units 128–133 each including two pressing pumps. A transmission gear 134 having a transmission ratio 1:0.5 is connected between camshafts 125 and 126. Each of the camshafts 122–127 is provided with two driving cams 135 and 136 angularly displaced relative to each other about 180°. Each cam 135 and 136 drives one of the pressing pumps 137 through 148.

In a glass-forming machine designed for the so-called double mold operation during which during each working cycle two glass objects are manufactured substantially simultaneously in a double mold, namely in two interconnected molding tools, the lubricaion or separation liquid is applied by means of pressing pumps 137, 139, 141 and 143 to parison mold halves corresponding to FIG. 8 and suspended on assigned tongue halves. These parison mold halves serve during press-blowing as connection pieces between a so-called block mold, namely an undivided lower part of a parison mold, and a split neck mold. The two block molds of a double mold are lubricated by nozzles driven for example by pressing pumps 138 and 140 and both plungers are lubricated by nozzles driven by pressing pumps 142 and 144. The remaining pressing pumps 145–148 are employed for spraying lubrication or separation liquid on the neck mold parts.

Figure 12:
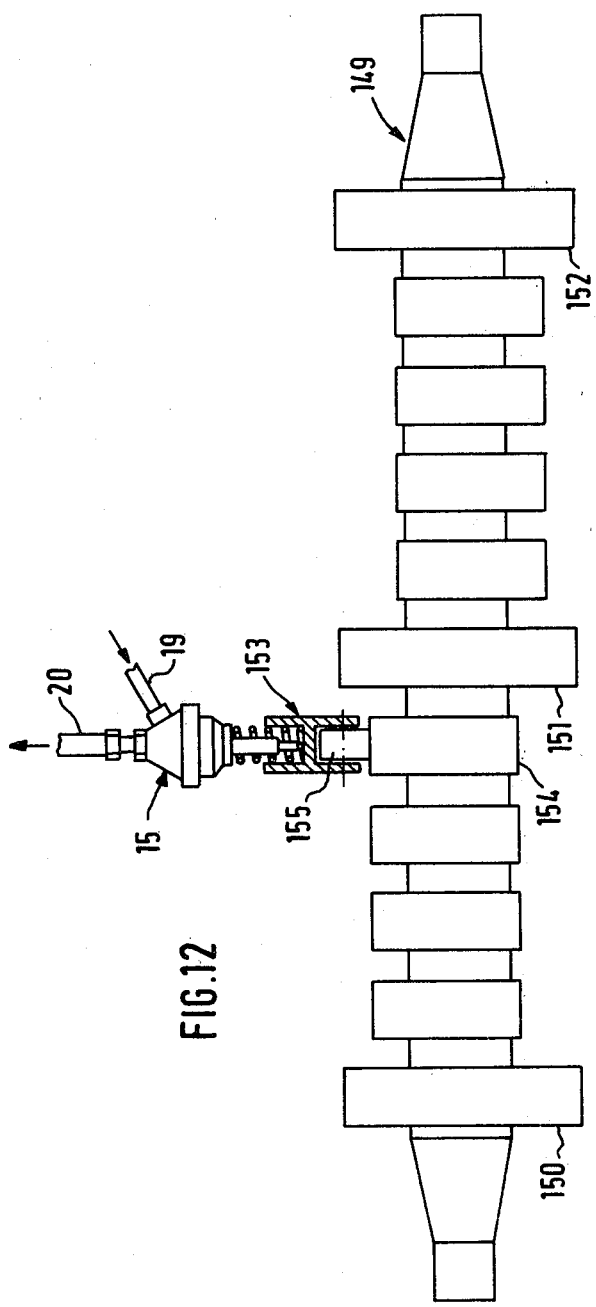
FIG. 12 is a side view of a modified version of the camshaft for a drive according to FIG. 11.

Instead of two cylinder pumps 128–133 having individual integrated drives as illustrated in FIG. 11, it is possible to use individual pressing pumps 15 with an external drive by means of a single camshaft 149, as shown in FIG. 12. The single camshaft 149 is formed with driving cams 154 corresponding to those in individual camshafts 122–125 and is supported for rotation in three bearings 150, 151 and 152.

Each driving cam cooperates with a plunger of a pressing pump 15, of which only one is illustrated in FIG. 12. An intermediate roller plunger 153 is disposed between the plunger of the pump and the assigned driving cam whereby a roller 155 rolls on the periphery of the driving cam 154.

Figure 13:
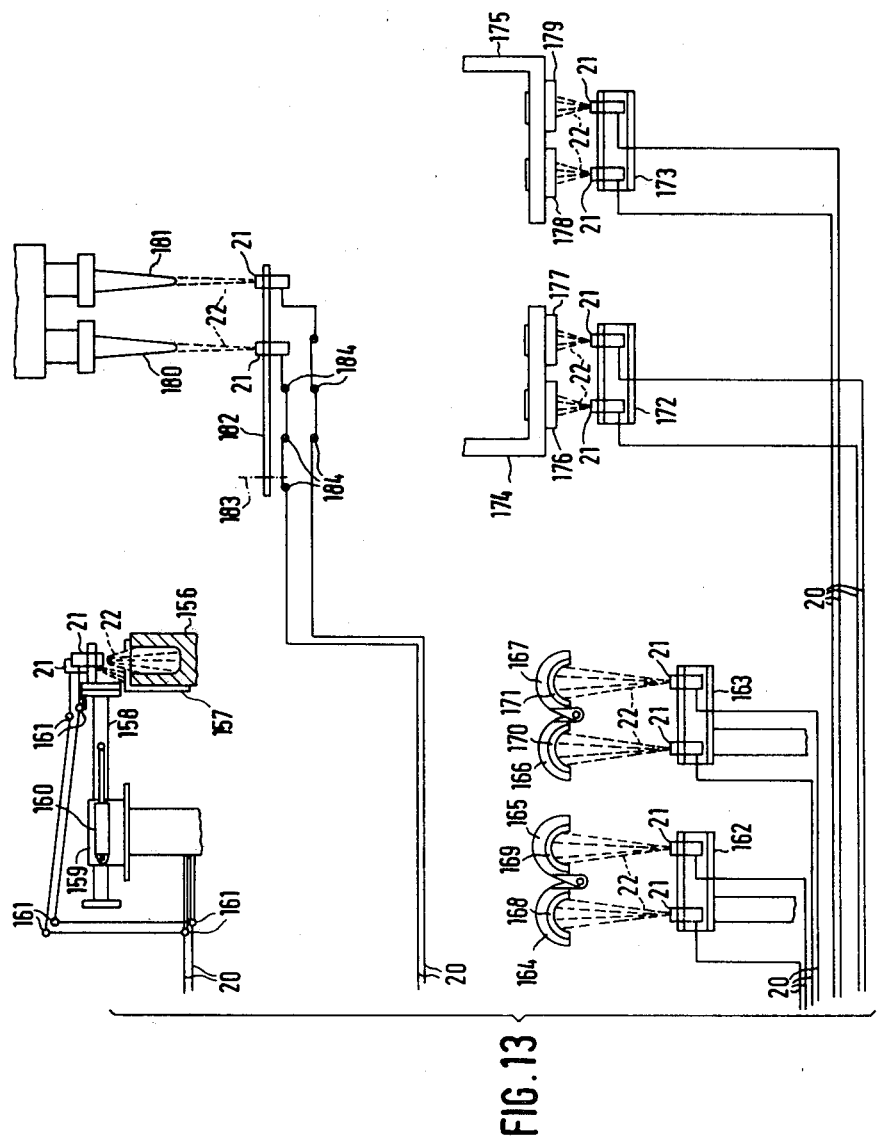
FIG. 13 is a schematic representation of an arrangement of spraying nozzles and of their high-pressure conduits.

FIG. 13 shows a layout of relevant parts of a glass-forming machine which are to be sprayed by a lubrication or separation liquid discharged from applicators according to this invention. The glass-forming machine in FIG. 13 is designed for the aforementioned double mold operation. Two undivided block molds 156 and 157 are arranged side-by-side and spaced apart for example about a distance of 120 millimeters. The lubrication or separation liquid is applied into each block mold 156 and 157 through a spraying nozzle 21 mounting on two reciprocating rods 158 also arranged parallel to each other. The rods 158 are displaceable in ball guides 159 fixedly mounted on the machine frame and driven by cylinder-and-piston units 160. Spraying nozzles 21, as seen from FIG. 13, are movable opposite the center of the block molds 156 and 157 where they are momentarily absolutely motionless and at this time point the spraying action is carried out. After the completion of the spraying, nozzles 21 are retracted away from their spraying position and a molten glass gob is inserted into each of the block molds. High-pressure conduits 20 between the pressing pumps and spraying nozzles 21 are articulated by hinge joints 161 to adjust the high-pressure conduits to the longitudinal reciprocating movement of the rods 158 and nozzles 21.

Another carriers 162 and 163 support respectively a pair of spraying nozzles 21 for spraying lubrication or separation liquid on parison mold halves 168–171 supported in corresponding tongue halves 164–167 shown in their fully opened position opposite the assigned spraying nozzle.

Additional pairs of spraying nozzles 21 are supported on carriers 172 and 173, the latter being rigidly mounted to the machine frame. Movable support arms 174 and 175 carry split neck molds 176–179. Cones 22 of atomized lubrication liquid are applied to the neck molds when the latter are in their closed condition.

Another pair of spraying nozzles 21 is arranged on a holding arm 182 in axial alignment with plungers 180 and 181. The holding arm 182 is supported for rotation about an upright pivot axle 183 and high-pressure conduits 20 leading to respective nozzles are again articulated by swivel joints 184 to follow the movement of the spraying nozzles. Plungers 180 and 181 are sprayed by the lubrication liquid at the moment when they stand still in their uppermost dead position as shown in FIG. 13.

The angle of the spraying cone 22 of the respective nozzles 21 differs according to the desired applications as depicted in respective forming stations in FIG. 13.

It will be understood that each of the elements described above, or two or more together, may also find a useful application in other types of constructions differing from the types described above.

While the invention has been illustrated and described as embodied in a lubrication or separation liquid applicator for use with glass-forming machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of an intermittent application of a lubrication or separation liquid without admixture of a carrier gas on at least one part of a glass-forming machine prior to its contact with the processed molten glass, such as shearing blades for shearing gobs off a glass strand, a gravity tube or a chute for guiding glass gobs, a mold, a mold part or a press plunger, comprising the steps of momentarily compressing the lubrication or separation liquid to a pressure exceeding 100 bar; then atomizing the compressed liquid; and applying a cone of the atomized liquid onto said machine part.

2. A method as defined in claim 1, wherein said compressing of the lubrication or separation liquid takes place in a pressing pump which includes an inlet port connected to a low-pressure conduit, said low-pressure conduit being branched into a feeding conduit including a feeding pump, and a return conduit connected via a pressure-limiting valve to a tank.

3. A method as defined in claim 1, wherein said compressing of the lubrication and separation liquid takes place in a pressing pump driven by a pneumatic motor.

4. A method as defined in claim 3, wherein said pneumatic motor includes a cylinder-and-piston unit having a piston rod in driving contact with at least one pressing pump.

5. A method as defined in claim 1, wherein said compressing of the lubrication and separation liquid takes place in a pressing pump driven by a camshaft.

6. A method as defined in claim 5, wherein said camshaft is coupled to a variable-speed electric driving motor.

7. A method as defined in claim 6, including a plurality of series-connected camshafts for driving a plurality of pressing pumps.

8. A method as defined in claim 7, further including at least one transmission gear respectively coupled between two camshafts.

9. A device for an intermittent application of a lubrication or separation liquid on at least one part of a glass-forming machine prior to its contact with the processed molten glass, such as shearing blades for shearing gobs off a glass strand, a gravity tube or a chute for guiding glass gobs, a mold, a mold part or a press plunger, the device comprising at least one pressing pump for delivering the lubricating or separating liquid at a pressure exceeding 100 bar; a means for intermittently driving said pump; a high-pressure conduit connected to the outlet of said pump; a spraying nozzle connected to said high-pressure conduit for applying a cone of atomized lubrication or separation liquid on said machine part, and wherein said driving means includes a solenoid having an armature in driving connection with said pressing pump, a discharging circuit including a series connection of a capacitor, of a winding of said solenoid and of an electrical controllable switching element, a power-supply circuit for charging said capacitor, and an electrical control circuit for intermittently triggering the switching element in said discharging circuit.

10. A device as defined in claim 9, wherein said power-supply circuit includes a rectifying circuit and a voltage doubler connected to a secondary winding of a transformer.

11. A device as defined in claim 9, wherein at least two of said power-supply circuits are connected in parallel to the secondary winding of a transformer, each of said power-supply circuits charging one of said capacitors.

12. A device as defined in claim 9, including a plurality of solenoids for driving a corresponding plurality of pressing pumps, the windings of the solenoids being connected in parallel in said discharging circuit.

13. A device as defined in claim 9, wherein said switching element in the discharging circuit is a thyristor having a control gate connected to said control circuit.

14. A device as defined in claim 9, wherein said power-supply circuit and said control circuit are galvanically separated one from the other by a coupling device such as an optoelectric coupler, a relay contact or a trigger transformer.

15. A device as defined in claim 9, wherein said control circuit includes a control element such as a switch or a programmable computing device adpated for controlling a plurality of said control elements according to a predetermined program or a proximity sensor to be influenced by a moving element of said glass-forming machine to initiate the actuation of respective control elements when said part of the glass-forming machine is in an optimum spraying position relative to said spraying nozzle.

16. A device as defined in claim 9, wherein said control circuit includes a control element in the form of a pushbutton switch.

* * * * *